(12) United States Patent
Trapp et al.

(10) Patent No.: US 7,668,177 B1
(45) Date of Patent: Feb. 23, 2010

(54) METHOD AND SYSTEM FOR QUALITY OF SERVICE IN HOST BUS ADAPTERS

(75) Inventors: Darren L. Trapp, Orange, CA (US); Sanjaya Anand, Coto De Caza, CA (US); Jerald K. Alston, Coto De Caza, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 435 days.

(21) Appl. No.: 11/669,573

(22) Filed: Jan. 31, 2007

Related U.S. Application Data

(60) Provisional application No. 60/882,405, filed on Dec. 28, 2006.

(51) Int. Cl.
*H04L 12/28* (2006.01)
(52) U.S. Cl. .................................. 370/395.42; 370/412
(58) Field of Classification Search ................. 370/351, 370/389, 412, 395.1, 395.4, 395.42, 394.43, 370/395.41, 229, 230, 230.1; 711/100, 147, 711/151, 154, 158; 709/213, 214, 216
See application file for complete search history.

(56) References Cited

U.S. PATENT DOCUMENTS

| | | | | |
|---|---|---|---|---|
| 6,519,666 | B1 * | 2/2003 | Azevedo et al. | 710/120 |
| 2004/0024930 | A1 * | 2/2004 | Nakayama et al. | 710/5 |
| 2004/0114608 | A1 * | 6/2004 | Rao et al. | 370/396 |
| 2004/0143663 | A1 * | 7/2004 | Leedom et al. | 709/226 |
| 2004/0213156 | A1 * | 10/2004 | Smallwood et al. | 370/232 |
| 2005/0073956 | A1 * | 4/2005 | Moores et al. | 370/235 |

\* cited by examiner

*Primary Examiner*—Kwang B Yao
*Assistant Examiner*—Obaidul Huq
(74) *Attorney, Agent, or Firm*—Klein, O'Neill & Singh, LLP (57) ABSTRACT

Method and system for an adapter coupled to a network via a network link is provided. The method includes using a first selectable mode and a second selectable mode to provide quality of service to a plurality of applications executed by one or more computing system. In the first selectable mode, the quality of service is based on allocating bandwidth of the network link and dynamically adjusting an initial priority assigned to a plurality of queues, each queue being associated with an application from among a plurality of applications. In the second selectable mode, the quality of service is based on a user assigning a priority to each of the plurality of applications and the adapter determines a number of input/output (I/O) requests it needs to process within a duration and then transfers information based on the determined number of I/O requests and the assigned priority.

21 Claims, 10 Drawing Sheets

METHOD AND SYSTEM FOR QUALITY OF SERVICE IN HOST BUS ADAPTERS

CROSS-REFERENCE TO RELATED APPLICATION

This patent application claims priority to provisional U.S. patent application Ser. No. 60/882,405, filed on Dec. 28th, 2006, entitled, "METHOD AND SYSTEM FOR QUALITY OF SERVICE IN HOST BUS ADAPTERS" under 35 USC §119, the disclosure of which is incorporated herein by reference in its entirety.

BACKGROUND

1. Field of the Invention

The present invention relates to networking systems, and more particularly, to bandwidth management and allocation.

2. Related Art

Storage area networks ("SANs") are commonly used in systems where plural memory storage devices are made available to various computing systems (also referred to as "host systems"). Data stored in a SAN is typically moved between the plural host systems and the plural memory storage devices.

Host systems often communicate with storage systems via a controller/adapter known as a host bus adapter ("HBA"), using a local bus standard, such as the Peripheral Component Interconnect ("PCI," "PCI-X", or "PCI-Express," all used interchangeably throughout the specification) bus interface. The PCI, PCI-X and PCI-Express standards are all incorporated herein by reference in their entirety.

HBAs are often shared by multiple applications with varying bandwidth needs. Conventional HBAs do not provide a minimum guaranteed bandwidth to individual applications, i.e. HBA's do not support Quality of Service (QOS) for each application. This can result in one application consuming a majority of available bandwidth, while preventing other applications from receiving any available bandwidth.

Therefore, what is needed is a system and associated method for a HBA to allocate and manage bandwidth.

SUMMARY OF THE INVENTION

In one aspect, a method for providing quality of service in a host bus adapter is provided. The method includes allocating bandwidth for a plurality of applications; determining a transfer rate for a plurality of queues based on the allocated bandwidth; assigning an initial queue priority value for each of the plurality of queues; monitoring a data transfer rate for each of a plurality of input/output (I/O) requests that service the plurality of queues; and adjusting the initial queue priority if the data transfer rate is beyond a threshold value.

In another aspect a host bus adapter is provided. The host bus adapter includes a processor for monitoring a data transfer rate for a plurality of queues that service a plurality of applications; wherein each application is allocated bandwidth by a user and each queue is assigned an initial priority; and the processor adjusts the initial priority if a current data transfer rate for a queue is beyond a threshold value.

In yet another aspect, a system for transferring information in a network is provided. The system includes a plurality of applications executed on a plurality of host systems; and a host bus adapter interfacing with the plurality of applications for transferring data. The host bus adapter includes a processor for monitoring a data transfer rate for a plurality of queues that service the plurality of applications; wherein each application is allocated bandwidth by a user and each queue is assigned an initial priority; and the processor adjusts the initial priority if a current data transfer rate for a queue is beyond a threshold value.

In yet another aspect, a system for accessing information from a storage device is provided. The system includes a user interface for setting priority for communicating with a storage device; and a Fibre Channel host bus adapter that determines a number of input/output requests to process input/output requests within a time interval.

In yet another aspect, a system for communicating with a storage system is provided. The system includes a Fibre Channel host bus adapter that provides quality of service to a plurality of applications in accessing the storage system.

This brief summary has been provided so that the nature of the invention may be understood quickly. A more complete understanding of the invention can be obtained by reference to the following detailed description of the embodiments thereof concerning the attached drawings.

BRIEF DESCRIPTION OF THE DRAWINGS

The foregoing features and other features of the present invention are now described with reference to the drawings. In the drawings, the same or similar components are delineated using the same reference numerals. The illustrated embodiments are intended to illustrate, but not to limit the invention. The drawings include the following Figures.

DETAILED DESCRIPTION

To facilitate an understanding of the embodiments, the general architecture and operation of a SAN, a host system and a HBA are now described. The specific architecture and operation of the embodiments will then be described with reference to the general architecture.

Besides PCI, PCI-X or PCI-Express mentioned above, other standards might be used to move data from host systems to memory storage devices in a SAN. Fibre channel is one such standard. Fibre channel (incorporated herein by reference in its entirety) is an American National Standard Institute (ANSI) set of standards, which provides a serial transmission protocol for storage and network protocols such as HIPPI, SCSI, IP, ATM and others.

Fibre Channel supports three different topologies: point-to-point, arbitrated loop and Fibre Channel Fabric. The point-to-point topology attaches two devices directly. The arbitrated loop topology attaches devices in a loop. The Fibre Channel Fabric topology attaches host systems directly to a Fabric, which is connected to multiple devices. The Fibre Channel Fabric topology allows several media types to be interconnected. It is noteworthy that the adaptive aspects described herein are not limited to PCI or Fibre Channel based networks.

Figure 1A:
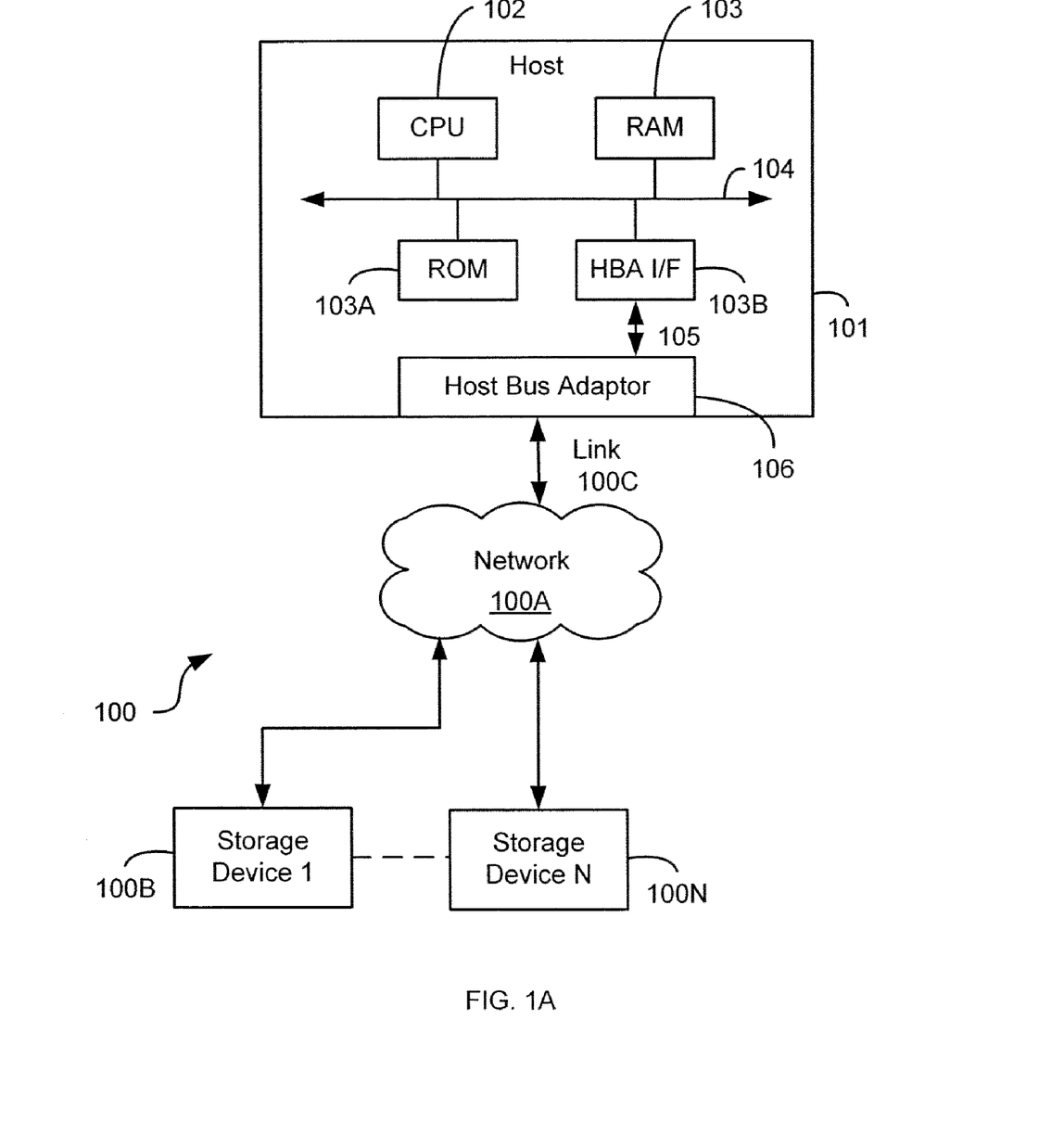
FIGS. 1A and 1B are diagrams illustrating examples of host systems using a HBA to communicate with a plurality of storage systems and various other systems, respectively, according to an embodiment.

SAN Overview:

FIG. 1A shows a system 100 with a computing or host system 101 representing a computer, server or other similar device, which may be coupled to plural storage devices or systems 100B-100N via network 100A. In general, host system 101 may typically include a host processor 102 (also referred to as a "central processing unit" or "CPU") coupled to computer bus 104 for processing data and instructions. In one embodiment, CPU 102 may be a Pentium Class microprocessor commercially available from the Intel Corporation or the equivalent.

A computer readable volatile memory unit 103, for example, a random access memory (RAM) unit may be coupled with bus 104 for temporarily storing data and instructions for host processor 102 and other systems of host system 101.

A computer readable non-volatile memory unit 103A, for example, read-only memory (ROM) unit, may also be coupled with bus 104 for storing non-volatile data and invariant instructions for host processor 102.

HBA 106 (also referred to as "adapter 106" or "controller 106") interfaces with CPU 102 via a HBA interface 103B and a peripheral bus 105. HBA 106 interfaces with network 100A via link 100C.

Link 100C may operate at different transfer rates, for example, at 1 gigabits per second ("Gb" or "Gbps"), 2 Gb, 4 Gb, 8 Gb and 10 Gb to transfer data. The available transfer rate to move data via link 100C is referred to as bandwidth throughout this specification. In one embodiment, as described below, HBA 106 manages available bandwidth for different individual applications that use HBA 106 to communicate with various network devices.

Figure 1B:
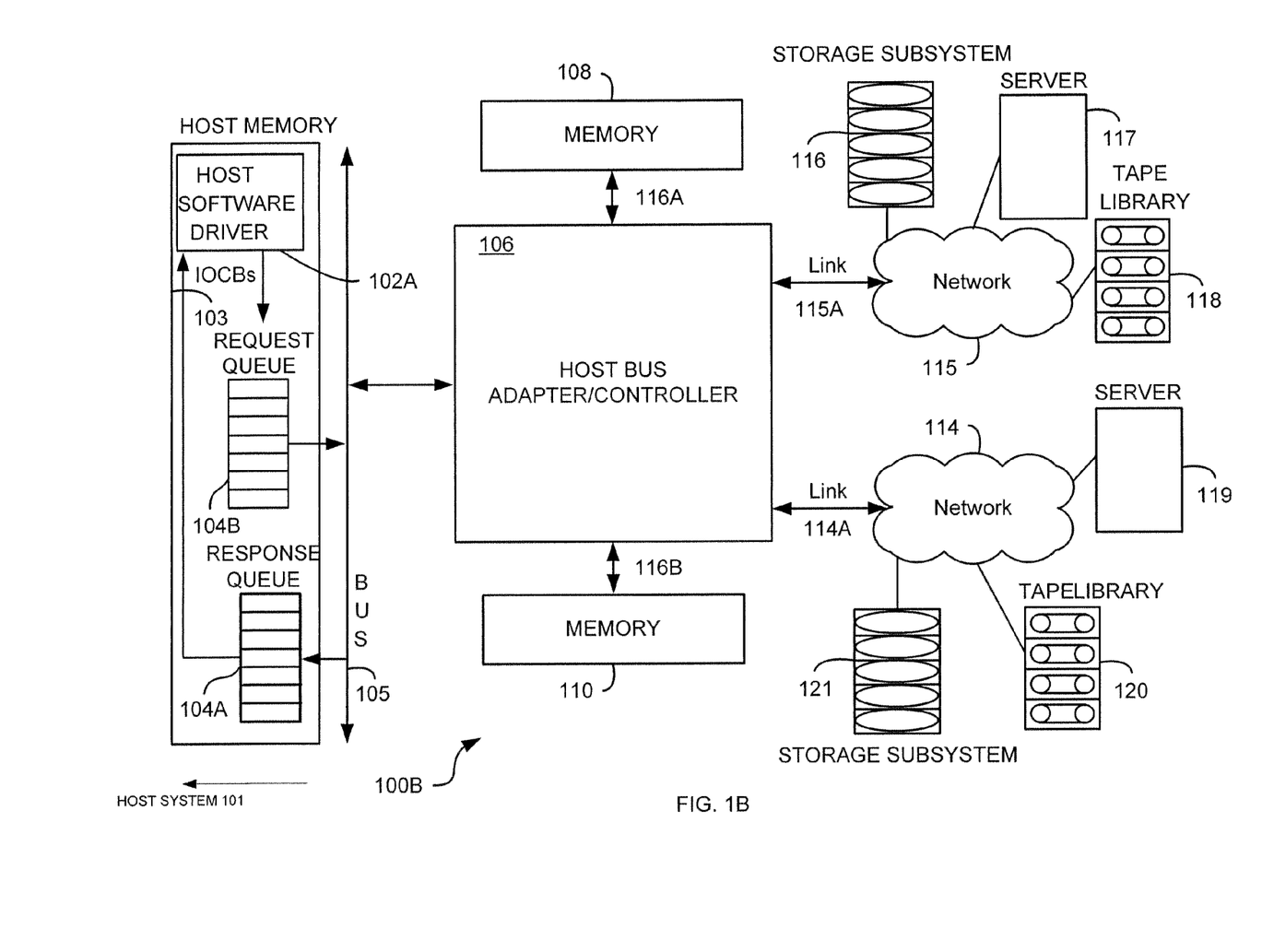

FIG. 1B shows another example of a system 100B where a host system 101 with host memory 103, uses HBA 106 to communicate with various systems, for example, storage sub-systems 116 and 121, tape libraries 118 and 120, and server 117 via networks 114 and 115, similar to network 100A. Links 115A and 114A are used by individual HBA ports (not shown) and are similar to link 100C.

Host memory 103 includes a driver 102A that coordinates data transfer operations using input/output control blocks ("IOCBs"). A request queue 104B and response queue 104A are maintained in host memory 103 and are used for transferring information, including, but not limited to, various data and commands. As described below, plural individual request queues are maintained in request queue 104B for plural individual applications. In one aspect, the individual request queues are assigned a priority and a bandwidth to provide a management capability.

HBA 106 has access to memory 108 and 110 that it can access via connections 116A and 116B, respectively.

Figure 1C:
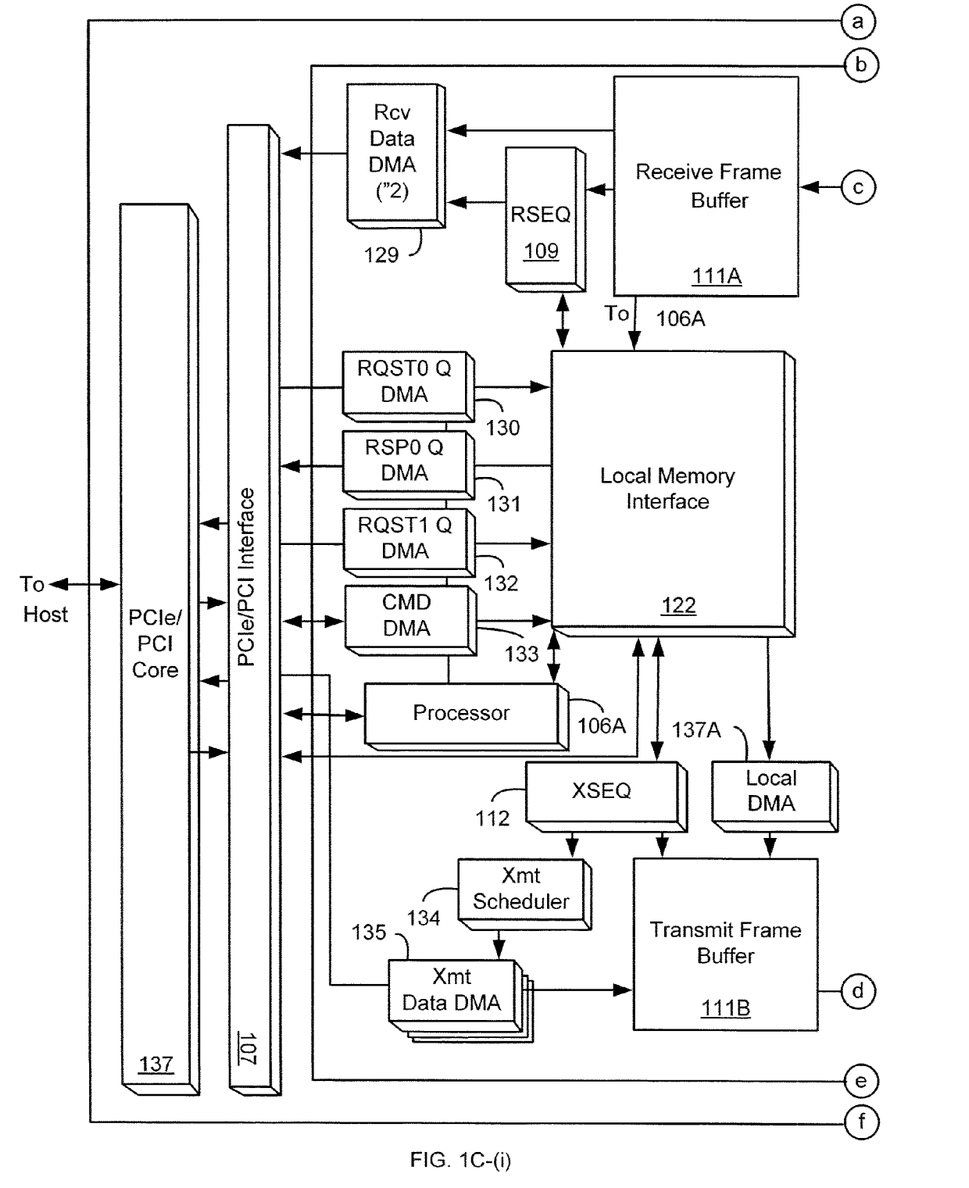
FIG. 1C shows a block diagram of a HBA, according to an embodiment.

HBA 106:

FIG. 1C shows a block diagram of adapter 106. Adapter 106 includes processors or state machine (may also be referred to as "sequencers") 112 and 109 for transmit and receive side, respectively for processing data received from storage sub-systems; and transmitting data to storage sub-systems. Memory storage (or Buffers) 111A and 111B are used to store information in receive and transmit paths, respectively.

Transmit path in this context means data path from host memory 103 to the storage systems via HBA 106. Receive path means a data path from a storage subsystem to host memory 103 via HBA 106. It is noteworthy, that only one processor is used for receive and transmit paths, and the adaptive aspects described herein are not limited to any particular number and type of processors.

HBA 106 also includes a processor 106A, which may be a reduced instruction set computer ("RISC") for performing various functions in HBA 106. RISC 106A executes software instructions (referred to as firmware 206 (FIG. 2)) to control overall HBA 106 operations. Processor 106A also adjusts data transfer rate (or input/output (I/O) rate) and to provide QOS to plural individual applications, as described below.

Adapter 106 receives and sends data and commands (may be referred to as information) via a serial/se-serializer (SERDES) 136. SERDES 136 converts serial data to parallel data and vice-versa.

HBA 106 also includes a protocol interface 113 that uses protocol specific commands and signals to process information to and from host system 101. The structure of protocol interface 113 depends on the network protocol. For example, if HBA 106 is coupled to Fibre Channel devices using the Fibre Channel protocol, then protocol interface 113 includes hardware, software to process Fibre Channel frames. In this example, protocol interface 113 may be referred to as a Fibre Channel interface or as a Fibre Channel Protocol Manager ("FPM"). Although protocol interface 113 is referred to hereafter as FPM 113, the adaptive aspects are not limited to any particular interface, standard or protocol.

Protocol Interface 113 includes a component (or buffer) 113A to handle all transmit path traffic and component (or buffer) 113B to handle all network traffic received by HBA 106. This allows data to move to and from storage subsystems 116, 121, tape library 118 and 120 and servers 117 and 119 (FIG. 1B).

Adapter 106 is coupled to memory 108 and 110 (referred interchangeably hereinafter) through local memory interface 122 (via connection 116A and 116B, respectively, (FIG. 1B)). Local memory interface 122 is provided for managing memory 108 and 110. Local direct memory access (DMA) module 137A is used for gaining access to move data from local memory (108 and 110).

HBA 106 further includes request queue DMA channel (0) 130, response queue DMA channel 131, request queue (1) DMA channel 132 that interface with request queue 104B and response queue 104A (FIG. 1B); and a command DMA channel 133 for managing command information.

Both receive and transmit paths have DMA modules 129 and 135, respectively. Transmit path also has a scheduler 134 that is coupled to processor 112 and schedules transmit operations. Interface 107 is used by various HBA 106 components to gain access to bus 105 and communicate with various components of host system 101.

DMA modules in general (for example, 135 and 129) are used to perform transfers between memory locations, or between memory locations and an input/output port. A DMA module functions without involving a microprocessor by initializing control registers in the DMA unit with transfer control information. The transfer control information generally includes source address (the address of the beginning of a block of data to be transferred), the destination address, and the size of the data block.

Figure 2:
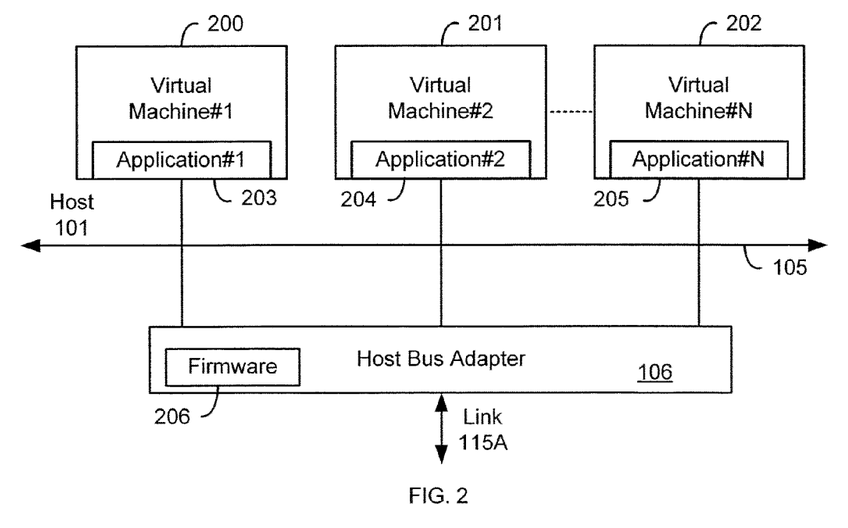
FIG. 2 is a diagram of a system with a plurality of individual applications in a virtual environment, according to an embodiment.

Multi-Application System:

FIG. 2 shows a top-level block diagram where plural applications 203, 204 and 205 operate in plural virtual machines 200, 201 and 202. Virtual machines are software applications that are provided by various vendors, for example, the product "VMware Virtual Center" is a virtual machine that is commercially available from Vmware Corporation. The virtual machines allow different applications to operate in different virtual environments. The virtual environment in this context means an operating system environment that is controlled by a virtual machine and not by a host system operating system.

Firmware 206 executed by processor 106A interfaces with the applications via driver 102A (FIG. 1B).

As described below, individual applications are allocated a certain bandwidth so that each individual application is guaranteed a minimum bandwidth. Hence, an application is not able to monopolize the bandwidth available across a particular link, such as the bandwidth of link 115A (FIG. 2).

It is noteworthy that the adaptive aspects described herein are not limited to a virtual machine environment. Plural individual applications, such as individual applications 203, 204 and 205 may operate in a single operating system environment and use the bandwidth allocation process, described herein.

Figure 3A:
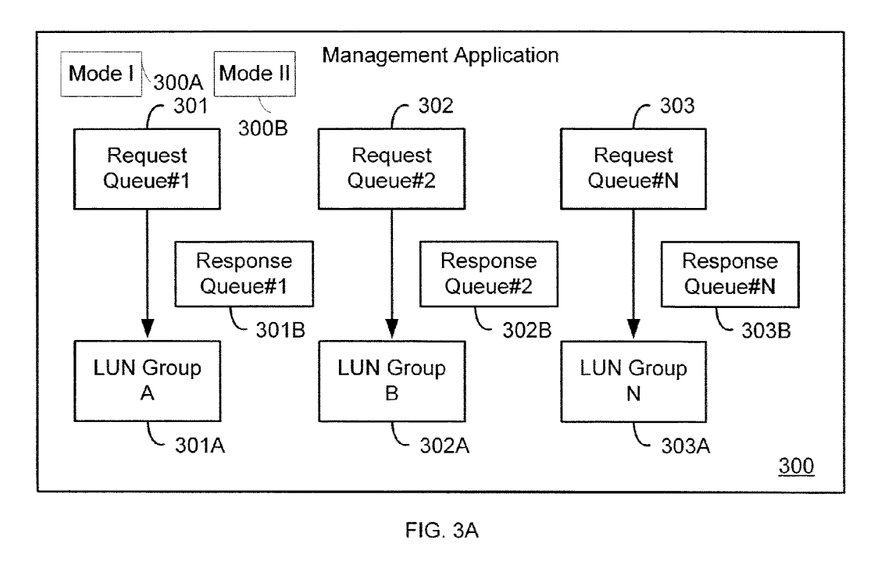
FIG. 3A shows a management application used to allocate bandwidth in a system having a plurality of individual applications, according to an embodiment.

QOS System:

FIG. 3A shows a management application 300 for configuring HBA 106. Management application 300 may be a graphical user interface or command line interface. Management application 300 runs on host system 101 (FIG. 1A) and allows a user to provide QOS in at least two modes.

In Mode I 300A, a user can allocate certain bandwidth to an application and based on that HBA 106 dynamically controls 40S and queue priorities, as described below.

In Mode II 300B, a user assigns priority to different applications and HBA 106 processes I/O requests based on the set priority.

Management application 300 allows a user to partition all or some storage devices or subsystems into one or more groups of logical unit numbers ("LUN Groups") so that each application communicates with a LUN group.

Host system 101 (FIG. 1A) maintains separate request and response queues for each application or LUN group. FIG. 3A shows the request queues as 301, 302 and 303 and response queues as 301B, 302B and 303B. Each queue is associated to a LUN group, shown as LUN group A (301A), LUN group B (302A) and LUN group N (303N).

A user can specify QOS for each LUN group as a percentage of bandwidth (Mode 1 300A operation), or priority (Mode II 300B operation), as described below. Allocated bandwidth for each queue (or LUN group) in Mode I 300A may be specified as a percentage of the total available link bandwidth. For example, an allocation of 25% of the bandwidth available for a 2 GB link is 100 megabytes per second.

Priority for a queue (or LUN group) (in Mode II 300B) may be specified as a number, for example, between 1 and 5, where 5 may be the highest or lowest priority. The user settings are provided to processor 106A via host driver 102A.

Figure 3B:
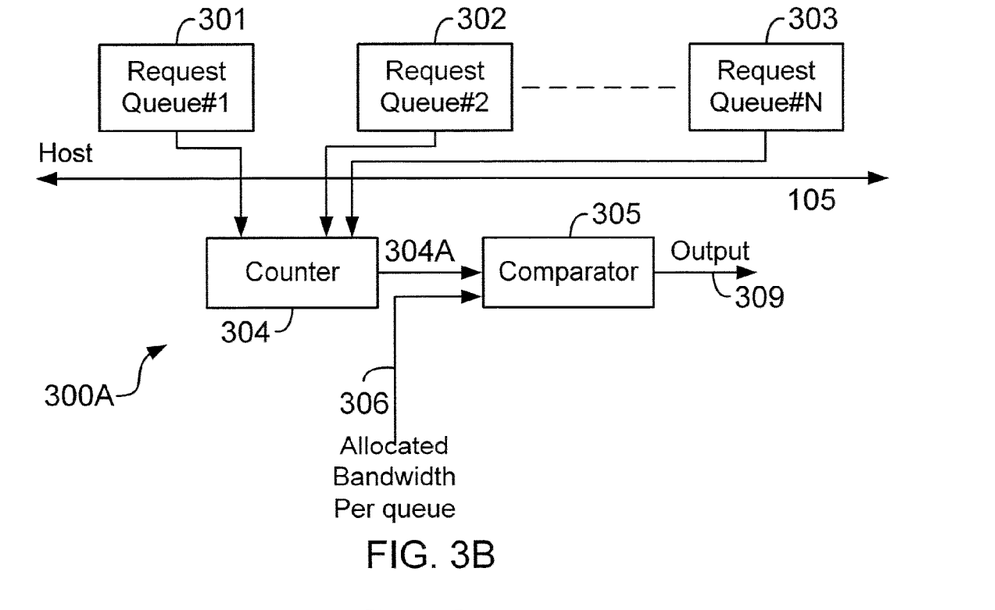
FIG. 3B is a diagram of a system used by a HBA for adjusting a data transfer rate, according to an embodiment.

FIG. 3B shows a system 300A for implementing QOS in HBA 106. Firmware executed by processor 106A (FIG. 1C) converts allocated bandwidth set by a user to a transfer rate (i.e. the allocated transfer rate) and an Internal Queue Priority ("IQP") value, as described below. Processor 106A converts the driver specified percentage (set by a user) into the transfer rate (for example, bytes per second), based on the speed or transfer rate of a particular link.

IQP may be a value between 1 and FFh. An IQP value less than FFh may be used to specify a maximum number of IOCBs that are fetched for a request queue when that queue is being serviced. IQP value of FFh may be used to denote that IOCBs continue to be fetched from a queue until the queue is empty. Processor 106A dynamically updates IQP values, as described below.

System 300A includes a counter 304 that maintains a cumulative transfer length (CTL) for each request queue. An I/O request is represented by one or more IOCBs in a request queue. The CTL value is a byte count for transferring a certain amount of data at any given time. When an input/output ("I/O") request is fetched from a request queue, the transfer length specified in the I/O request is added to counter 304 value for that queue.

At certain intervals (for example, 100 milliseconds), output 304A from counter 304 is sent to comparator 305. Comparator 305 may be implemented in software, hardware, or a combination thereof. Comparator 305 also receives the allocated bandwidth for each queue (shown as 306). The allocated bandwidth may be input as a byte count.

Comparator 305 compares output 304A to the allocated bandwidth 306. The compare results, Output 309, are sent to processor 106A. Output 309 shows the difference between the bandwidth consumed (or needed) by a queue at any given time and the allocated bandwidth to the queue. Output 309 is used to adjust the data transfer rate and IQP for each queue in real time during normal HBA 106 operation.

Figure 4:
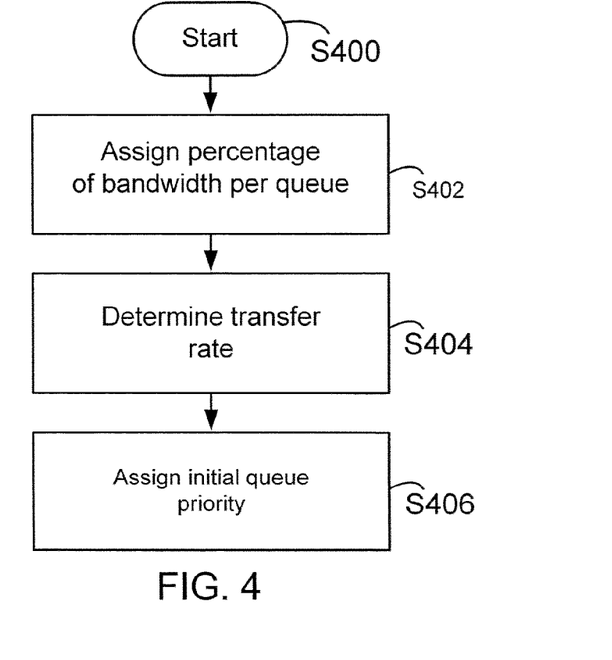
FIG. 4 shows a process flow diagram for configuring bandwidth, according to an embodiment.

Process Flow:

FIG. 4 shows a process flow diagram for allocating bandwidth in Mode I 300A (FIG. 3A) for plural applications or queues that are used to service plural applications, in one aspect of this disclosure. The process starts in step S400.

In step S402, a user via a management application (for example, management application 300, FIG. 3A) may initially assign a certain percentage of the total link bandwidth for each queue (or group of queues, used interchangeably throughout this specification). For example, as shown in FIG. 3A, each queue, 301, 302 and 303 are assigned a certain percentage of the bandwidth of a link, such as link 115A (FIG. 2). In this example, queue 301 may be assigned 25 percent of the bandwidth available for a particular link, while queue 302 may be assigned 20 percent of the available bandwidth.

Referring back to FIG. 4, in step S404, a data transfer rate (also referred to as allocated transfer rate) for each queue is determined based on the allocated bandwidth. Processor 106A (FIG. 3A) obtains the link speed of a particular link and determines the transfer rate by applying the allocated bandwidth percentage. For example, if link 115A (FIG. 2) operates at 2 Gb and request queue 301 (FIG. 3B) is allocated 25% of the bandwidth, then a maximum transfer rate of 100 MB/s is set for queue 301.

In step S406, processor 106A also assigns each queue an initial priority (IQP). A numerical rating system may be used to assign initial queue priority. The initial IQP value may be the same or is based on the allocated bandwidth percentage. For example, a user may assign the highest priority to queue 301 (for example, 5) and assign the lowest priority to queue 302 (for example, 1) depending on the allocated bandwidth.

The foregoing example is only provided to illustrate the broad adaptive aspects of the present disclosure and is not intended to limit the disclosure to any particular prioritization scheme.

Figure 5:
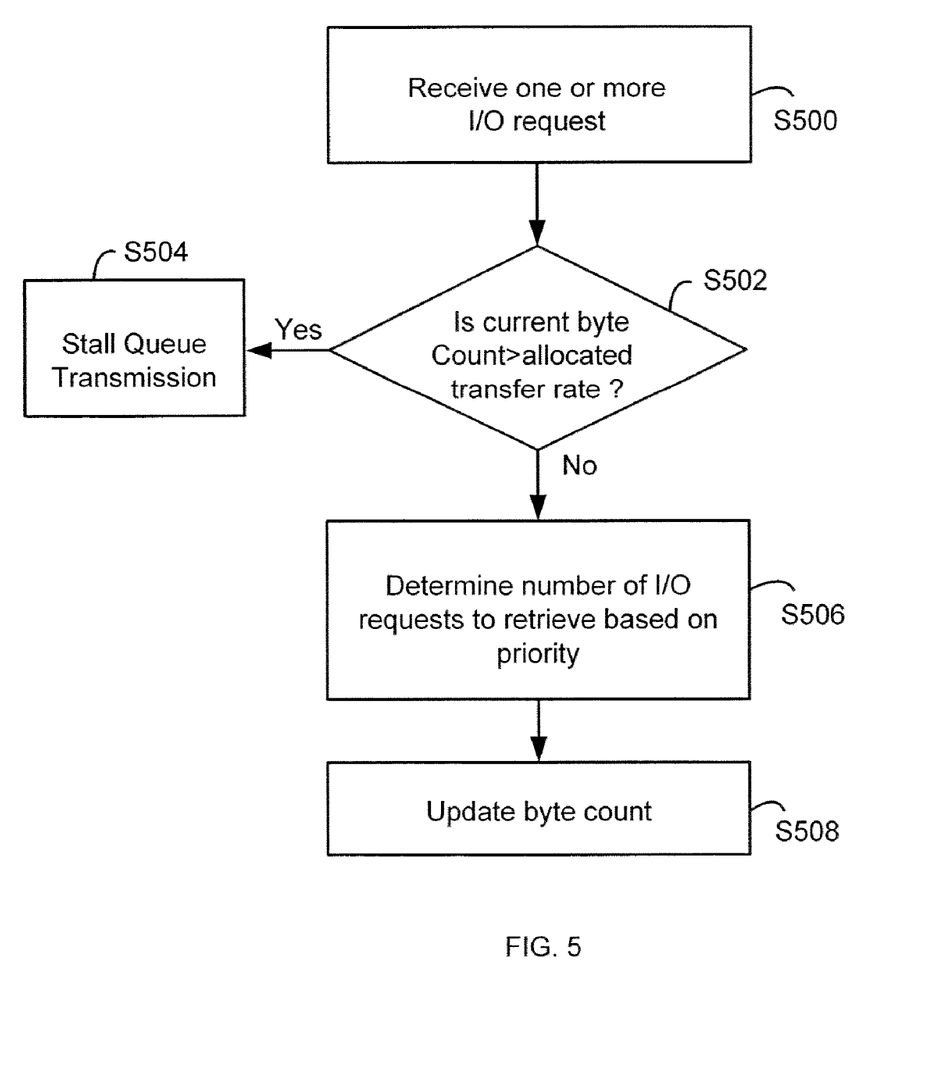
FIG. 5 shows a process flow diagram for processing input/output ("I/O") requests, according to an embodiment.

FIG. 5 shows a process flow diagram for processing I/O requests based on the QOS associated with each application, according to one aspect of this disclosure. The process starts in step S500, when HBA 106 receives one or more I/O request.

In step S502, processor 106A (FIG. 1C) determines if a current byte count for an I/O queue (i.e. a request queue) is greater than an allocated transfer rate (step S404, FIG. 4). If yes, then in step S504, the I/O request processing for the queue is stalled and the process moves back to step S500. This indicates that a particular individual application has consumed its allocated bandwidth.

If in step S502, a current byte count for a queue is less than the allocated transfer rate, then in step S506, processor 106A determines the number of I/O requests that are pending and the number of I/O requests it has to retrieve to service the particular I/O request.

In step S508, each I/O request byte count, i.e. the byte count for each request queue, is added to a current byte count for each queue and the I/O requests are processed. The process continues until each I/O request is processed.

The foregoing process prevents a single I/O request from consuming the entire bandwidth of a link and provides for a minimal amount of bandwidth (QOS) for each queue or application.

Figure 6:
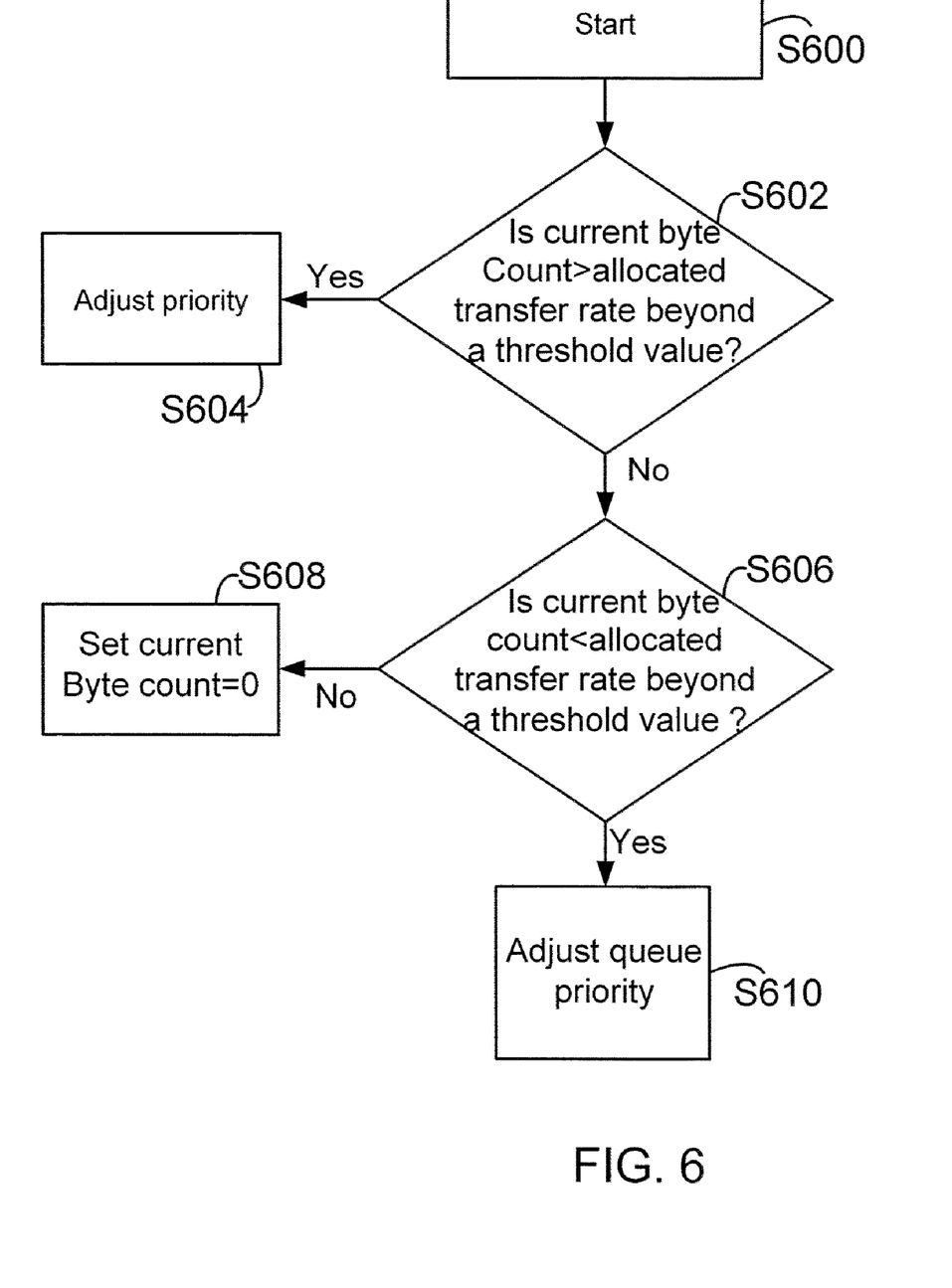
FIG. 6 shows a process flow diagram for adjusting data transfer rate and priority, according to an embodiment.

FIG. 6 shows a process flow diagram for dynamically adjusting queue priority based on network conditions. Processor 106A may conduct these operations for each queue at regular intervals or at any instance. The process starts in step S600.

In step S602, processor 106A (FIG. 1C) determines if a current byte count for each queue is greater than the allocated transfer rate (step S404, FIG. 4) beyond a certain threshold value. If yes, then in step S604, processor 106A may lower the IQP for the queue so that a particular queue is not consuming the entire bandwidth of link 115A beyond a certain limit. The threshold value may be programmable by a user.

If the current byte count is not greater than the allocated transfer rate in step S602, then in step S606, processor 106A determines if the byte count is less than the allocated transfer rate and if the difference is beyond a programmable threshold value. For example, if the current byte count is X, and the allocated transfer is Y and the threshold value is T, then processor 106A compares Y-X with T to determine if the queue priority needs to be adjusted. If the difference is beyond the threshold value, then the queue priority is increased in step S610; otherwise in step S608, the current byte count of the queue is set to zero (i.e. cleared) for a next time interval or slice.

The following example summarizes process steps for dynamically adjusting allocated bandwidth and IQP as described in FIG. 6:
Case 1: If the counter value is greater than the allocated transfer rate beyond a threshold value:
If (CTL>TR)
{
  If ((CTL−TR)>1000)
  {
    IQP--
    CTL=CTL−TR
  }
  Else
    CTL=0
}
Else // (CTL<=TR)
{
Case 2: Counter value is less than or equal to allocated bandwidth:
If ((TR−CTL)>1000)
{
  IQP++
}
CTL=0
}

IQP=Internal Queue Priority; CTL=Current counter 304 value; TR=Allocated transfer (step S404) 1000=Programmable threshold value. It is noteworthy that any threshold value may be used to implement the adaptive aspects of the present disclosure.

In one aspect, a request queue is serviced several times during a time interval or slice, while IQP adjustment may be made once within that interval. Processor 106A looks at both IQP and counter 304 values when servicing a particular queue. For example, if counter 304 value is higher than the allocated transfer rate, then IOCBs are not fetched for that queue, even if IQP is high. This prevents any particular application from consuming more than its allocated share of bandwidth and provides a QOS for each application.

Figure 7:
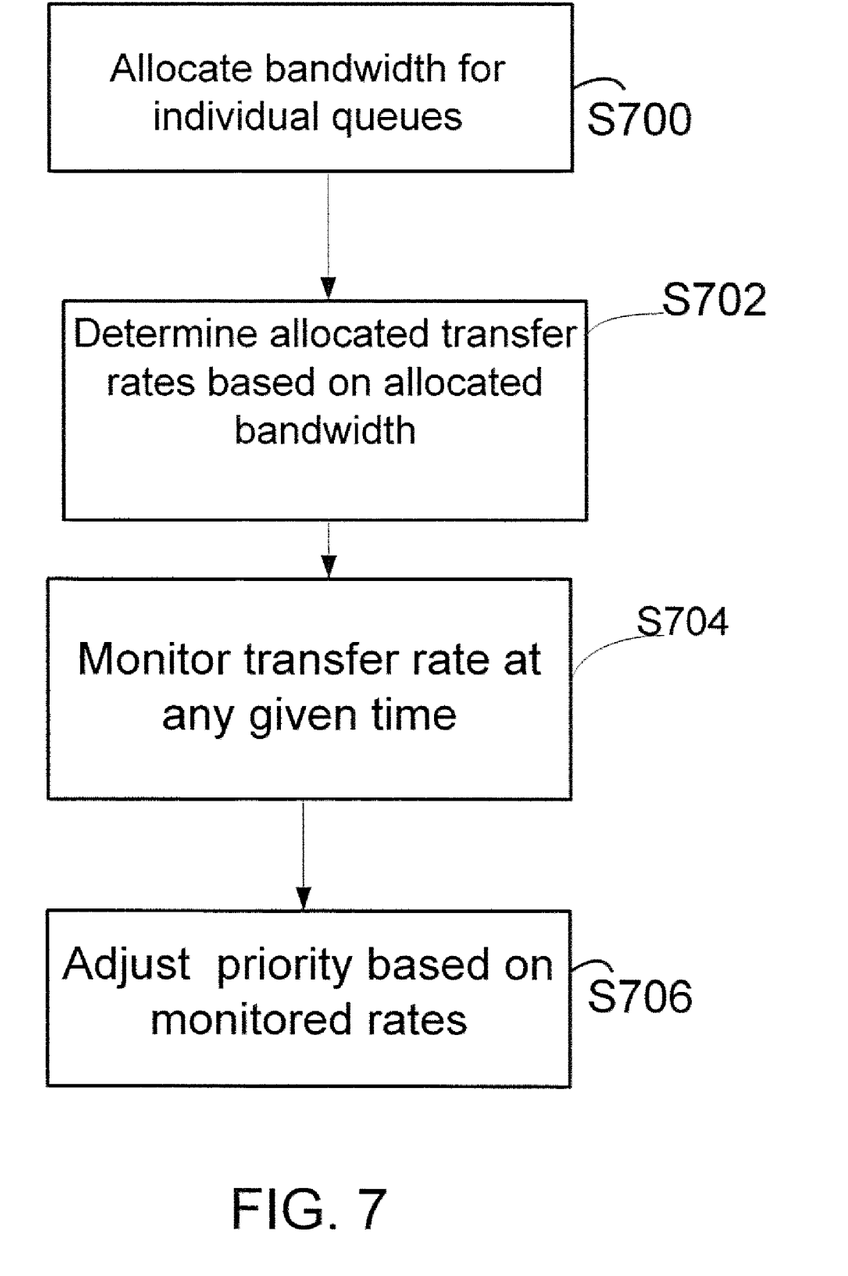
FIG. 7 shows a top-level block diagram for providing QOS using a HBA, according to an embodiment.

FIG. 7 shows a top-level flow diagram for providing QOS in a HBA, according to one aspect. The process starts in step S700, as described above, when a user for individual queues or group of queues allocates initial bandwidth. As mentioned above these queues may be assigned to certain applications.

In step S702, based on the allocated bandwidth, HBA 106 determines the transfer rates (referred to as allocated transfer rate through out this specification) for each queue.

In step S704, a current transfer rate (or byte count) is monitored for each queue. The system of FIG. 3B may be used to monitor the current transfer rate.

In step S706, HBA 106 adjusts queue priority, if the current transfer rate is low or high, based on a comparison with programmable threshold values, as described above with respect to FIG. 6.

Figure 8:
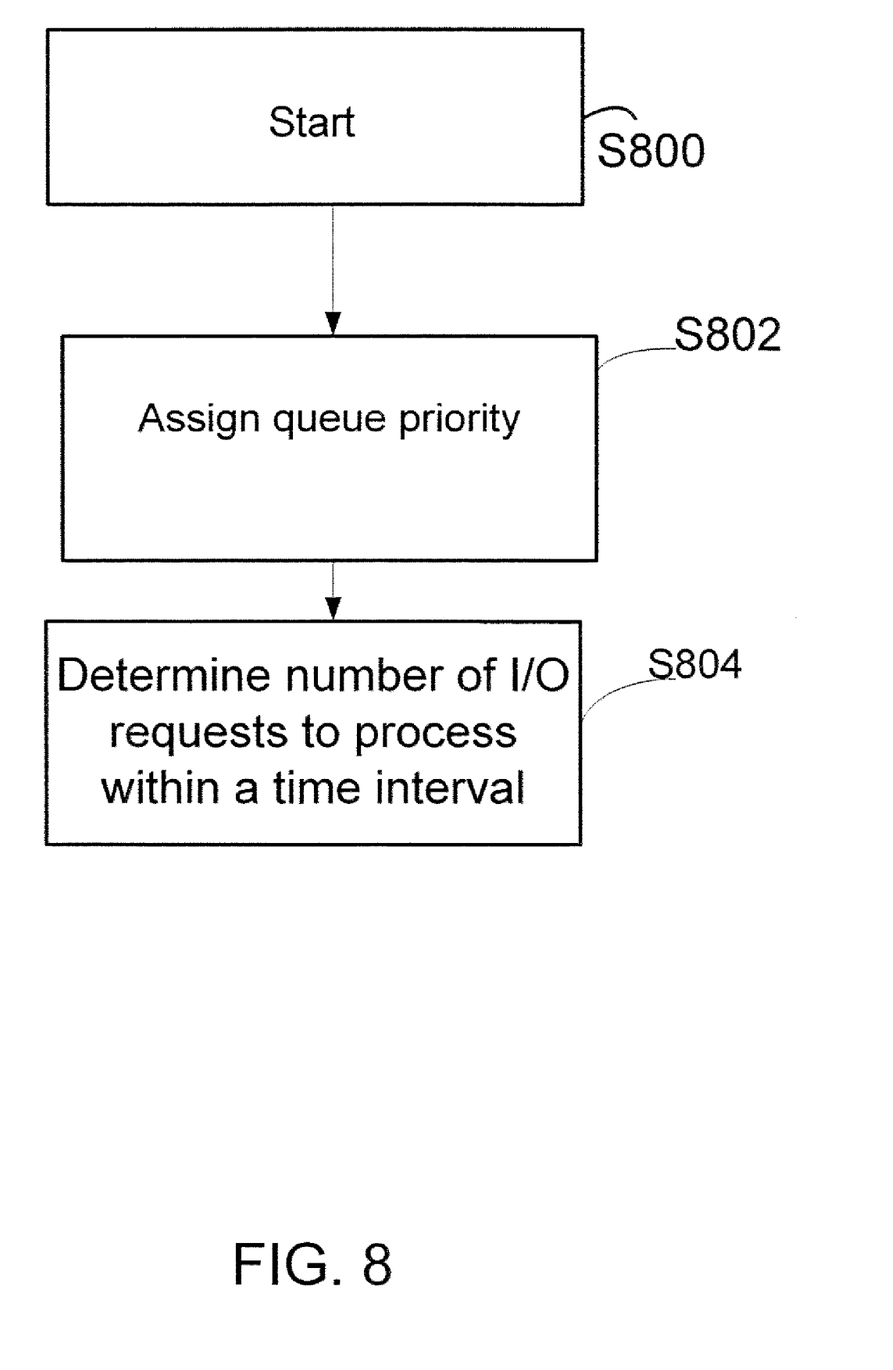
FIG. 8 shows another process flow diagram for managing queue priority, according to one embodiment.

FIG. 8 shows a process flow diagram for providing QOS for Mode II 300B (FIG. 3B) operation. The process starts in step S800 when a user is provided access to a management application. In step S802, a user using a management application (for example, 300, FIG. 3B) assigns queue priority for accessing a LUN group or storage device. In step S804, HBA 106 determines the number of I/O requests it needs to process based on the allocated priority for a given time interval. Thereafter, HBA 106 transfers data based on the allocated priority and the number of determined I/O requests.

In one aspect, QOS is provided in Fibre Channel HBA so that one application does not monopolize link bandwidth. The Fibre Channel standard by itself does not suggest or disclose the QOS concept, as described above.

Although the present invention has been described with reference to specific embodiments, these embodiments are illustrative only and not limiting.

Many other applications and embodiments of the present invention will be apparent in light of this disclosure and the following claims. The foregoing adaptive aspects are useful for any networking environment where there is disparity between link transfer rates.

What is claimed is:

1. A method for providing quality of service in a host bus adapter, comprising:
(a) providing a first selectable mode and a second selectable mode for establishing quality of service for the host bus adapter;
wherein in the first selectable mode, the quality of service is based on a user allocating bandwidth of a network link and dynamically adjusting an initial priority assigned to each of a plurality of queues, each queue being associated with an application from among a plurality of applications that are executed by one or more computing system; and wherein in the second selectable mode, the quality of service is based on a user assigning a priority to each of the plurality of applications, and the host bus adapter determines a number of input/output (I/O) requests it needs to process within a duration and then transfers information based on the determined number of I/O requests and the assigned priority;

(b) if the first mode is selected, then allocating a percentage of a total bandwidth of the network link among the plurality of applications;

(c) determining a transfer rate for the plurality of queues based on the allocated bandwidth;

(d) assigning an initial queue priority value for each of the plurality of queues;

(e) monitoring a data transfer rate for each of a plurality of I/O requests that service the plurality of queues; and (f) dynamically adjusting the initial queue priority if the data transfer rate is beyond a threshold value at a given time.

2. The method of claim 1, wherein a user via a user interface allocates bandwidth to each of the plurality of applications and the host bus adapter determines the transfer rate based on a link speed.

3. The method of claim 1, further comprising
reducing the initial queue priority for a queue if a current byte count for the queue is greater than the threshold value.

4. The method of claim 1, further comprising:
increasing the initial queue priority for a queue if a current byte count for the queue is less than the threshold value.

5. The method of claim 1, further comprising:
stalling data transfer for a queue, if a byte count value for the queue exceeds the threshold value.

6. A host bus adapter operationally coupled to another device via a network link, comprising:
a processor for monitoring a data transfer rate for a plurality of queues that service a plurality of applications, and for providing quality of service to the plurality of applications;
wherein each queue is associated with an application from among the plurality of applications that are executed by one or more computing systems;
wherein the quality of service is provided in a first selectable mode and a second selectable mode;
wherein in the first selectable mode, the quality of service is based on a user allocating a percentage of bandwidth of the network link to each of the plurality of applications; and assigning an initial priority to each of the plurality of queues; and the processor dynamically adjusts the initial priority of a queue if a current data transfer rate for the queue is beyond a threshold value; and
wherein in the second selectable mode, the quality of service is based on a user assigning a priority to each of the plurality of applications and the host bus adapter determines a number of input/output (I/O) requests it needs to process within a duration and then transfer information based on the determined number of I/O requests and the assigned priority.

7. The host bus adapter of claim 6, wherein the processor determines a transfer rate for each queue based on a link speed.

8. The host bus adapter of claim 6, wherein if a current byte count for a queue is greater than the threshold value, then the initial priority for the queue is reduced.

9. The host bus adapter of claim 6, wherein if a current byte count for a queue is less than the threshold value, then the initial priority for the queue is increased.

10. The host bus adapter of claim 6, wherein the processor dynamically adjusts the initial priority based on a current byte count value for a queue.

11. The host bus adapter of claim 6, wherein the host bus adapter stalls data transfer for a queue, if a byte count value for the queue exceeds the threshold value.

12. A system for transferring information in a network, comprising:
a plurality of applications executed on a plurality of host systems; and
a host bus adapter interfacing with the plurality of applications, wherein the host bus adapter comprises a processor for monitoring a data transfer rate for a plurality of queues that service the plurality of applications, and for providing quality of service to the plurality of applications;
wherein each queue is associated with an application from among the plurality of applications;
wherein the quality of service is provided in a first selectable mode and a second selectable mode;
wherein in the first selectable mode, the quality of service is based on a user allocating a percentage of bandwidth of the network link to each of the plurality of applications; and assigning an initial priority to each of the plurality of queues; and the processor dynamically adjusts the initial priority of a queue if a current data transfer rate for the queue is beyond a threshold value; and
wherein in the second selectable mode, the quality of service is based on a user assigning a priority to each of the plurality of applications and the host bus adapter determines a number of input/output (I/O) requests it needs to process within a duration and then transfers information based on the determined number of I/O requests and the assigned priority.

13. The system of claim 12, wherein the processor determines a transfer rate for each queue based on a link speed.

14. The system of claim 12, wherein if a current byte count for a queue is greater than the threshold value, then the initial priority for the queue is reduced by the host bus adapter.

15. The system of claim 12, wherein if a current byte count for a queue is less than the threshold value, then the initial priority for the queue is increased.

16. The system of claim 12, wherein the processor dynamically adjusts the initial priority based on a current byte count value for a queue.

17. The system of claim 12, wherein the host bus adapter stalls data transfer for a queue, if a byte count value for the queue exceeds the threshold value.

18. A method for an adapter coupled to a network via a network link, comprising:
(a) using a first selectable mode and a second selectable mode to provide quality of service to a plurality of applications executed by one or more computing systems;
wherein in the first selectable mode, the quality of service is based on allocating bandwidth of the network link and dynamically adjusting an initial priority assigned to a plurality of queues, each queue being associated with an application from among a plurality of applications; and
wherein in the second selectable mode, the quality of service is based on a user assigning a priority to each of the plurality of applications and the adapter determines a number of input/output (I/O) requests it needs to process within a duration and then transfers information based on the determined number of I/O requests and the assigned priority;

(b) if the first mode is selected, then allocating a percentage of a total bandwidth of the network link among the plurality of applications;

(c) determining a transfer rate for the plurality of queues based on the allocated bandwidth;

(d) assigning an initial queue priority value for each of the plurality of queues;

(e) monitoring a data transfer rate for each of a plurality of I/O requests that service the plurality of queues; and (f) dynamically adjusting the initial queue priority if the data transfer rate is beyond a threshold value at a given time.

19. The method of claim 18, further comprising:

reducing the initial queue priority for a queue if a current byte count for the queue is greater than the threshold value;

increasing the initial queue priority for the queue if a current byte count for the queue is less than the threshold value.

20. A system for transferring information in a network, comprising:

a plurality of applications executed on a plurality of host systems; and an adapter that includes:

a processor for providing quality of service to the plurality of applications, where the processor monitors a data transfer rate for a plurality of queues that service the plurality of applications;

wherein each queue is associated with an application from among the plurality of applications;

wherein the quality of service is provided in a first selectable mode and a second selectable mode;

wherein in the first selectable mode, the quality of service is based on allocating a percentage of bandwidth of the network link to each of the plurality of applications and assigning an initial priority to each of the plurality of queues; and the processor dynamically adjusts the initial priority of a queue if a current data transfer rate for the queue is beyond a threshold value; and wherein in the second selectable mode, the quality of service is based on a user assigning a priority to each of the plurality of applications, and the adapter determines a number of input/output (I/O) requests it needs to process within a duration and then transfers information based on the determined number of I/O requests and the assigned priority.

21. The system of claim 20, wherein the processor determines a transfer rate for each queue based on a link speed; and if a current byte count for a queue is greater than the threshold value, then the initial priority for the queue is reduced by the adapter and if the current byte count for the queue is less than the threshold value, then the initial priority for the queue is increased.

* * * * *

UNITED STATES PATENT AND TRADEMARK OFFICE
CERTIFICATE OF CORRECTION

PATENT NO. : 7,668,177 B1  Page 1 of 1
APPLICATION NO. : 11/669573
DATED : February 23, 2010
INVENTOR(S) : Trapp et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 458 days.

Signed and Sealed this

Seventh Day of December, 2010

David J. Kappos
*Director of the United States Patent and Trademark Office*

UNITED STATES PATENT AND TRADEMARK OFFICE
CERTIFICATE OF CORRECTION

PATENT NO. : 7,668,177 B1  Page 1 of 1
APPLICATION NO. : 11/669573
DATED : February 23, 2010
INVENTOR(S) : Darren L. Trapp et al.

It is certified that error appears in the above-identified patent and that said Letters Patent is hereby corrected as shown below:

In column 8, line 53-57, delete "Many other applications and embodiments of the present invention will be apparent in light of this disclosure and the following claims. The foregoing adaptive aspects are useful for any networking environment where there is disparity between link transfer rates." and insert the same on Col. 8, Line 52, after "limiting." as a continuation of the same paragraph.

In column 9, line 28, in claim 3, after "comprising" insert -- : --.

Signed and Sealed this
Twenty-eighth Day of June, 2011

David J. Kappos
*Director of the United States Patent and Trademark Office*